(12) United States Patent
Stadler et al.

(10) Patent No.: US 7,459,115 B2
(45) Date of Patent: Dec. 2, 2008

(54) METHOD FOR PRODUCING COMPOSITE ELEMENTS

(75) Inventors: Edmund Stadler, Hollfeld (DE); Peter Reinerth, Emmering (DE); Armin Deininger, Emmering (DE); Armin Reindl, Munich (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 581 days.

(21) Appl. No.: 10/514,565

(22) PCT Filed: Jun. 4, 2003

(86) PCT No.: PCT/EP03/05818

§ 371 (c)(1),
(2), (4) Date: Dec. 1, 2004

(87) PCT Pub. No.: WO03/103958

PCT Pub. Date: Dec. 18, 2003

(65) Prior Publication Data

US 2005/0244651 A1 Nov. 3, 2005

(30) Foreign Application Priority Data

Jun. 6, 2002 (DE) ................. 102 25 338

(51) Int. Cl.
*B29C 45/14* (2006.01)
(52) U.S. Cl. ............... 264/261; 264/267; 264/328.8
(58) Field of Classification Search ............ None
See application file for complete search history.

(56) References Cited

U.S. PATENT DOCUMENTS

| | | | | |
|---|---|---|---|---|
| 3,026,575 A | * | 3/1962 | Lusher et al. | 264/135 |
| 3,090,078 A | * | 5/1963 | Ackles | 264/46.5 |
| 3,440,315 A | * | 4/1969 | Shockey | 264/261 |
| 3,490,978 A | * | 1/1970 | Deisenroth et al. | 156/293 |
| 3,696,452 A | | 10/1972 | Ziegler | |
| 3,864,201 A | | 2/1975 | Susuki et al. | |
| 4,259,274 A | * | 3/1981 | Tiitola | 264/46.5 |
| 4,299,639 A | * | 11/1981 | Bayer | 156/104 |
| 4,655,473 A | * | 4/1987 | Muller et al. | 280/610 |
| 5,993,719 A | * | 11/1999 | Abe et al. | 264/257 |
| 6,669,890 B1 | * | 12/2003 | Sato et al. | 264/261 |
| 7,198,075 B2 | * | 4/2007 | Korosy et al. | 141/164 |
| 2001/0035266 A1 | * | 11/2001 | Kennedy | 156/331.4 |
| 2005/0118369 A1 | * | 6/2005 | Kennedy | 428/35.7 |
| 2006/0157891 A1 | * | 7/2006 | Hardy et al. | 264/261 |

FOREIGN PATENT DOCUMENTS

| | | |
|---|---|---|
| DE | 28 28 734 | 1/1979 |
| DE | 198 25 084 | 12/1999 |
| DE | 198 25 085 | 12/1999 |
| DE | 198 25 087 | 12/1999 |
| DE | 198 35 727 | 2/2000 |
| EP | 0 421 222 | 4/1991 |
| GB | 1 033 594 | 6/1966 |
| GB | 2 066 156 | 7/1981 |
| WO | 90 05633 | 5/1990 |
| WO | 98 21029 | 5/1998 |
| WO | 99 64234 | 12/1999 |
| WO | 02 20342 | 3/2002 |
| WO | 03 002321 | 1/2003 |
| WO | 03 002341 | 1/2003 |

\* cited by examiner

*Primary Examiner*—Edmund H. Lee
(74) *Attorney, Agent, or Firm*—Oblon, Spivak, McClelland, Maier & Neustadt, P.C.

(57) ABSTRACT

In a process for the production of composite elements which have the following layer structure:
 (i) from 2 to 20 mm of metal, plastic or wood,
 (ii) from 10 to 300 mm of plastic and
 (iii) from 2 to 20 mm of metal, plastic or wood,
the starting materials for the production of (ii) are introduced in the liquid state in at least two steps into the space between (i) and (iii), the space to be filled in the last filling process having a volume of from 0.1 to 1.5 $m^3$ and the height of the space to be filled being less than 25 mm.

5 Claims, No Drawings

METHOD FOR PRODUCING COMPOSITE ELEMENTS

CROSS REFERENCES TO RELATED APPLICATIONS

This application is a national stage application of International Patent Application No. PCT/EP03/05818, filed on Jun. 4, 2003, and claims priority to German Patent Application No. 102 25 338.2, filed on Jun. 6, 2002, both of which are incorporated herein by reference in their entireties.

The present invention relates to a process for the production of composite elements which have the following layer structure:
(i) from 2 to 20 mm, preferably from 2 to 10 mm, particularly preferably from 5 to 10 mm, of metal, plastic or wood, preferably metal,
(ii) from 10 to 300 mm, preferably from 10 to 100 mm, of plastic, preferably polyisocyanate polyadducts, and
(iii) from 2 to 20 mm, preferably from 2 to 10 mm, particularly preferably from 5 to 10 mm, of metal, plastic or wood, preferably metal, by filling the space between preferably horizontally aligned layers (i) and (iii) with liquid starting components for the production of (ii), preferably with a reaction mixture containing (a) isocyanates and (b) compounds reactive toward isocyanates, for the preparation of (ii) polyisocyanate polyadducts. The dimensional data stated at the outset for the layers (i), (ii) and (iii) relate to the thicknesses of the respective layer. In addition, the present invention relates to composite elements obtainable by the novel process and ships and structures comprising the novel composite elements.

BACKGROUND OF THE INVENTION

For the construction of ships, for example ships' hulls and hold covers, bridges, roofs or multistorey buildings, it is necessary to use structural parts which are capable of withstanding considerable loads produced by external forces. Because of these requirements, such structural parts usually consist of metal plates or metal supports which are strengthened by an appropriate geometry or suitable braces. Because of high safety standards, hulls of tankers therefore usually consist of an inner and an outer hull, each hull being composed of 15 mm thick steel plates which are connected to one another by about 2 m long steel braces. Since these steel plates are subject to considerable forces, both the outer and the inner steel hull are stiffened by welded-on reinforcing elements. Both the considerable amounts of steel required and the time-consuming and labor-intensive production are disadvantages of these traditional structural parts. Moreover, such structural parts have a considerable weight, resulting in a lower tonnage of the ships and an increased fuel requirement. In addition, such traditional structural elements based on steel require a very great deal of maintenance since both the outer surface and the surfaces of the steel parts between the outer and inner hull have to be regularly protected from corrosion.

SPS (sandwich plate system) elements which comprise a composite of metal and plastic are known as a substitute for the steel structure. Adhesion of the plastic to the two metal layers gives composite elements having extraordinary advantages compared with known steel structures. Such SPS elements are disclosed in U.S. Pat. No. 6,050,208, U.S. Pat. No. 5,778,813, DE-A 198 25 083, DE-A 198 25 085, DE-A 198 25 084, DE-A 198 25 087 and DE-A 198 35 727. Usually, these composite elements are produced by pouring or injecting the starting materials for the preparation of the polyisocyanate polyadducts in a single operation between the metal plates. Since the reactive starting components for the preparation of the plastics in the composite element begin to react as early as during mixing and complete filling of the space between the metal plates is essential for a satisfactory product, the process of injection of the starting components is a decisive and critical step in the production of the composite elements.

SUMMARY OF THE INVENTION

It is an object of the present invention to provide an improved process for the production of the composite elements described at the outset. By means of this process, it was intended to optimize especially the filling of the space between the plates (i) and (iii) in particular with reactive starting components for the preparation of plastics (ii) between the plates (i) and (iii). This production process is intended in particular to reduce the proportion of defective elements substantially and to permit reliable introduction of liquid components between the plates of the composite element. It was intended in particular to avoid cavities between the layers (i) and (iii), i.e. the space to be filled between (i) and (iii) should be filled as completely as possible with the starting components for the production of (ii).

DETAILED DESCRIPTION OF THE INVENTION

We have found that this object is achieved, according to the invention, if the starting materials for the production of (ii) are introduced in the liquid state, in at least two, preferably two, steps, into the space between (i) and (iii), the space to be filled in the last filling process having a volume of from 0.1 to 1.5 $m^3$, preferably from 0.4 to 1.0 $m^3$, and the height of the space to be filled being less than 25 mm, preferably from 10 to 20 mm. The height of the space to be filled in the last filling process is obtained from the distance between the plastic (ii) introduced in the penultimate filling operation and the upper layer (i) or (iii). Preferably, in each filling process, from 0.1 to 1.5 $m^3$, preferably from 0.4 to 1.0 $m^3$, of liquid starting components for the production of (ii) are introduced. The layers (i) and (iii) are preferably aligned horizontally. The deviation of (i) and (iii) from the horizontal plane is in each case preferably less than 0.5°, preferably from 0 to 0.3°. After a filling operation (x), the subsequent filling process (x+1) is preferably not carried out until the starting components of the preceding filling process (x) have reacted to give the plastic (ii) to such an extent that the liquid starting components of the two filling processes (x) and (x+1) cannot mix with one another. The space to be filled preferably has a width of from 0.5 to 4 m, particularly preferably from 1 to 3 m, a length of from 1 to 12 m, particularly preferably from 4 to 8 m, and a height, i.e. a distance between the layers (i) and (iii), of from 20 to 150 mm, particularly preferably from 30 to 60 mm, i.e. the layers (i) and (iii) preferably also have at least the stated length and width.

The novel filling process is thus preferably divided into two steps:

In a first filling process, a part of the space to be filled and having horizontally aligned plates (i) and (iii) is filled with the liquid starting materials. Before the remaining space is completely filled with other liquid starting components in a second filling process, the starting components of the first filling process are allowed to react to such an extent that the reactive starting materials introduced in the second filling process do not mix with the substances introduced in the first filling process. The time between the end of the first filling process and the beginning of the second filling operation is preferably from 5 to 120 minutes. In a second filling process, the remaining space between the already introduced, at least partly reacted starting components for the production of (ii) is then completely filled with further starting components which may be identical to or different from those of the first filling process.

This novel process has in particular the following advantages:

Possible air inclusions are reduced to a minimum. Consequently, a maximum contact surface of (ii) with (i) or (iii) and hence an optimum force distribution on loading the composite elements are achieved. Moreover, the exothermicity is reduced by the small layer thicknesses, with the result that the shrinkage of (ii) is also reduced and therefore stresses in the composite element, in particular at the contact surface of (ii) with (i) and (iii), are avoided. The low exothermicity also reduces the internal pressure, produced by micro air bubbles, in the composite element. This makes it possible to design the apparatus required for fixing (i) and (iii) in the filling process with the reactive starting components in a simpler and hence more economical manner. Furthermore, it is now possible to realize larger volumes of (ii) which, owing to the limited output of the polyurethane processing plants, would not be possible with only one filling process.

The starting materials for the production of (ii) can preferably be introduced in the liquid state into the space between (i) and (iii), a reduced pressure being generated during this filling process in the space between (i) and (iii) to be filled. This has the advantage that, particularly in the last filling process, the liquid is sucked into the space and small cavities are also filled with the liquid. The reduced pressure in the space to be filled is preferably from 0.2 to 0.8 Pa, i.e. the pressure in the mold to be filled is from 0.8 to 0.2 Pa lower than ambient air pressure. The reduced pressure, which can be generated, for example, by generally known vacuum pumps, is preferably reached if, in addition to the orifice or orifices (iv) in (i) and/or (iii), via which the starting materials for the production of (ii) are introduced, (i) and/or (iii) have at least one further orifice (v) via which the reduced pressure is applied. A tube is preferably connected between a vacuum pump which generates the reduced pressure and the orifice (v) in (i). This tube may be, for example, pressed or adhesively bonded onto (i). The amounts of starting materials for the production of (ii) are difficult to meter in such a way that precisely the space (S) to be filled is filled in the last filling process but overflow is prevented. In the last filling process, a larger amount of starting components for the production of (ii) is therefore preferably introduced into the space between (i) and (iii) than said space can hold. The resulting overflow is preferably removed via orifices (v). As soon as the space between (i) and (iii) has been completely filled with the starting components for the production of (ii), the filling can be terminated on the basis of a rise of the liquid in the tube, which is preferably transparent, and the orifices (iv) and (v) can be closed. The closing of the orifices can be effected, for example, by means of a plastic or metal plug, preferably having a screw closure, which is present either in the overflow vessel or preferably between overflow vessel and (i) and/or (iii). The orifices (iv) preferably remain closed by the fixed mixing head until the end of the curing process of the mixture (a) and (b). The space to be filled between (i) and (iii) preferably has only the orifices (iv) and (v), the outflow end, preferably the mixing head, being present at (iv) and it being possible to apply the preferred reduced pressure at (v). Since, according to this preferred embodiment, no air can enter the space to be filled, it is possible to generate a reduced pressure.

Usually, the layers (i) and (iii) have no features which can serve for fastening an outflow end for filling the space between (i) and (iii) with liquids. The term outflow end may mean conventional apparatuses with the aid of which liquids are filled, for example tank nozzles, tube ends, mixing heads, static mixers or the like. The outflow end is preferably a mixing head. Such mixing heads are generally known and are commercially available, for example in association with conventional metering means for polyurethane systems. The outflow end, preferably the mixing head, can preferably be fastened by screwing the outflow end of the delivery means or a holder for the outflow end of the delivery means at at least three points, preferably three to six points, particularly preferably four or five points, to the layer (i). The liquid is preferably introduced through at least one orifice (iv) in (i) and/or (iii) into the space between (i) and (iii). For fastening, for example, a mixing head, bolts which have a thread and serve for fastening the mixing head or a holder for the mixing head can preferably be driven into the layer (i). These bolts can preferably taper on the side facing away from the thread, in order to be able to introduce them more easily into the layer (i). The bolts preferably have a diameter of from 6 to 20 mm and a length of from 8 to 42 mm. The thread, which is directed outward after fixing of the bolts, i.e. preferably has a length of from 4 to 30 mm on the side which faces away from (iii). The bolts are introduced, for example, by driving with the aid of a bolt driver, which is commercially available, for example, from Hilti. Preferably, (i) therefore has threads with the aid of which the outflow end is screwed to (i) at the orifice (iv) through which the liquid is introduced. In order to improve the seal between the outflow end and the layer (i), an O-ring of a resilient material can preferably be fixed between the layer (i) and the mixing head. Such O-rings are generally known and can be tailored in their dimensions to the diameter of the orifice (iv) and the mixing head. The mixing head is therefore preferably fixed tightly to the orifice (iv) in (i) or (iii) through which the starting materials are introduced.

Particularly preferably, the outflow end is not fastened directly to the layer (i) but is fixed to a holder which is screwed to (i). This holder, which may consist of conventional materials, for example plastics, wood or preferably conventional metals, is preferably a structure which has bores through which the threads fixed to (i) are passed and fastened, for example, by means of corresponding nuts. Moreover, the holder has fastening elements for the outflow end, for example plug connectors, screw connectors or edges with which the outflow end can be clamped to the holder by means of elastic bands. Particularly preferably, the outflow end is fastened to the holder in at least three points in order to avoid tilting. A holder is therefore preferably screwed on at least three threads which are fastened to (i) and the mixing head is fixed on this holder. The bolts can be sawn off after completion of the composite elements, for example at the surface of (i).

The filling of the space between (i) and (iii) can be carried out using conventional conveying means, preferably continuously, for example by means of high pressure and low pressure machines, preferably high pressure machines. The filling is preferably effected using a high pressure machine via one or more mixing heads, preferably one mixing head, in which the starting components are mixed. The filling of the space between (i) and (iii) can be effected either with vertical orientation of (i) and (iii) or with the preferred horizontal orientation of (i) and (iii) described above.

The layers (i) and (iii) used may preferably be in the form of conventional plastic, wood or preferably metal plates, for example iron, steel, copper and/or aluminum plates, having the thicknesses according to the invention. Both (i) and (iii) may be coated, for example primed or finished, and/or coated with conventional plastics for use in the production of the novel composite elements. (i) and (iii) are preferably used uncoated. The surfaces of (i) and (iii) can be blasted with sand or steel balls, preferably with corundum or iron pyrites, before the production of composite elements, for cleaning and increasing the surface roughness. This blasting can be effected by the conventional methods in which the blasting material strikes the surfaces, for example, under high pressure. Suitable apparatuses for such a treatment are commercially available. By means of this treatment of the surfaces of (i) and (iii), which are in contact with (ii) after the reaction of (a) with (b), leads to a substantially improved adhesion of (ii) to (i) and (iii). The blasting is preferably carried out directly before the introduction of the components for the production of (ii) into the space between (i) and (iii). The surfaces of (i) and (iii) to which (ii) is to adhere are preferably free from inorganic and/or organic substances which reduce adhesion, for example dust, dirt, oils and fats or substances generally known as mold release agents.

The layers (i) and (iii) are preferably arranged parallel. The lateral edges of the space between (i) and (iii) which is filled with (ii) are preferably sealed, preferably with plastic films or sheets, paper sheets or metal foils or plates, particularly preferably metal plates, which are preferably adhesively bonded, welded or pressed on, preferably welded on, and which, if required, may also serve as spacers.

The space to be filled can preferably be dried. This has the advantage that in particular liquid components to be filled which are reactive toward water, for example isocyanates, do not undergo an undesirable secondary reaction. The drying, which preferably takes place directly before the filling, can be effected, for example, by means of hot air or by means of compressed air. Furthermore, the space to be filled between (i) and (iii) can be dried by heating (i) and/or (iii) to a temperature of from 20 to 150° C. for from 10 to 180 minutes. The space to be filled between (i) and (iii) can preferably be dried by means of a blower which passes air through orifices (iv) and (v) in (i) and/or (iii) and through the space to be filled between (i) and (iii).

The orifices (iv) and (v) are preferably bores in (i) and/or (iii), having a diameter of from 0.5 to 5.0 cm.

The space which is filled between (i) and (iii) with the starting materials for the production of (ii) need not constitute the total space between (i) and (iii). Both (i) and (iii) can project beyond (ii) at the edges, i.e. bonding of (i) to (iii) via (ii) takes place only in a part of (i) and (iii). For example, the space between (i) and (iii) can be sealed before filling with the starting materials, in such a way that the seal is present within the space enclosed by (i) and (iii) and edges of (i) and/or (iii) project.

The delivery may be varied as a function of the volume to be filled. In order to ensure homogeneous curing of (ii), the delivery and conveying apparatus are preferably chosen so that the space to be filled can be filled in the course of from 0.5 to 20 minutes with the components for the production of (ii). Low pressure or, particularly preferably high pressure machines, preferably with piston metering, particularly preferably axial piston metering, are preferably employed, the storage container preferably being equipped with a stirrer and preferably being thermostatable and a storage container-mixing head-storage container circulation preferably being present, the discharge preferably being from 0.1 to 3.0 kg/sec.

In the development of suitable production processes, it was found that uncontrolled running out of liquid starting components for the production of (ii) is a fault which can scarcely be eliminated. Owing to the limited amount per shot, an uncontrolled loss of starting material for the production of (ii) leads to incomplete filling of the space between (i) and (iii). Owing to the rapid reaction and the very good adhesion of (ii) to (i) and (iii), incomplete filling results in large regions in the composite element which contain no (ii) and furthermore can no longer be filled with starting components. Such composite elements unfortunately have to be discarded. In order to prevent a loss of starting components, it has therefore proven advantageous to check the mold to be filled very carefully for tightness. Usually, the layers (i) and (iii) are fixed in a suitable arrangement, for example parallel to one another. The spacing is usually chosen so that the space (S) between (i) and (iii) has a thickness of from 10 to 300 mm. The fixing of (i) and (iii) can be effected, for example, by means of spacers, for example in a mold or suitable holder. The edges of the intermediate space are usually sealed in such a way that the space between (i) and (iii) can be completely filled with the liquid or the starting components for the production of (ii) but running out of these starting components before complete filling is prevented. The sealing can be effected by means of conventional plastic films and/or sheets, paper sheets or metal foils and/or plates, which, for example, are adhesively bonded, welded or pressed on and which, if required, may also serve as spacers. This preferred sealing does not relate to the preferred orifices (iv) and (v) which were described at the outset. The tightness of (S) before filling with the starting components is preferably checked by pressure difference measurement. The term pressure difference measurement is to be understood as meaning that an attempt is made to establish a pressure difference between the space (S) and the outer environment over a certain period, for example by attempting to achieve in (S) a lower or a higher pressure in relation to the outer environment. This can be achieved by conventional vacuum pumps or generally known compressors which pump air or gas into the space (S). If a stable lower or higher pressure can be generated in (S), this indicates a sufficiently tight cavity which can be filled with the starting components for the production of (ii). It is preferable to ensure that the orifices (iv) and (v) which are provided for filling (S) with the starting components or as vent orifices or as overflow orifices for the emergence of excess starting components are likewise temporarily sealed. If required, at least one of these orifices may serve for connecting a vacuum pump or compressor to (S).

The mold to be filled preferably consists of said layers (i) and (iii), which are preferably arranged parallel, and preferably of seals between the layers (i) and (iii), which prevent running out of the liquid during filling. The layer (ii) is thus preferably arranged with adhesive bonding between the layers (i) and (iii).

The liquid for the production of (ii) preferably contains (a) isocyanates and (b) compounds reactive toward isocyanates. The layer (ii) thus preferably comprises polyisocyanate polyadducts. In this document, the terms starting materials and starting components are to be understood as meaning in particular (a) isocyanates and (b) compounds reactive toward isocyanates, but, where they are used, also (c) gases, (d) catalysts, (e) assistants and/or (f) blowing agents.

The reaction of (a) with (b) to give (ii) is preferably carried out in the presence of from 1 to 50% by volume of gases (c). Polymer polyols are preferably used as (b). The reaction of (a) with (b) is preferably carried out in the presence of (f) blowing agents.

The starting components for the preparation of the polyisocyanate polyadducts are usually mixed at from 0 to 100° C., preferably from 20 to 60° C., and introduced as described above into the space between (i) and (iii). The mixing can be effected mechanically by means of a stirrer or a spiral stirrer, but preferably by the countercurrent principle which is customary in the case of high pressure machines and in which A and B component jets meet and mix in the mixing head under high pressure in each case, it also being possible for the jet of each component to be divided. The reaction temperature, i.e. the temperature at which reaction takes place, is usually >20° C., preferably from 50 to 150° C., depending on the material thickness.

The polyisocyanate polyadducts (ii) of the composite elements produced according to the invention preferably have a modulus of elasticity of >275 MPa in the temperature range of −45 to +50° C. (according to DIN 53 457), an adhesion to (i) and (iii) of >4 MPa (according to DIN 53 530), an elongation of >30% in the temperature range of −45 to +50° C. (according to DIN 53 504), a tensile strength of >20 MPa (according to DIN 53 504) and a compressive strength of >20 MPa (according to DIN 53 421).

The production of the novel composite elements can thus preferably be carried out by preparing, between (i) and (iii), polyisocyanate polyadducts (ii), usually polyurethanes, which may have urea and/or isocyanurate structures, by reacting (a) isocyanates with (b) compounds reactive toward isocyanates, in the presence or absence of blowing agents (f), from 1 to 50% by volume, based on the volume of the polyisocyanate polyadducts, of at least one gas (c), (d) catalysts and/or (e) assistants, (ii) preferably adhering to (i) and (iii). The preparation of such polyisocyanate polyadducts (ii) has been widely described.

The starting materials (a), (b), (c), (d), (e) and (f) in the novel process are described below by way of example:

Suitable isocyanates (a) are the aliphatic, cycloaliphatic, araliphatic and/or aromatic isocyanates known per se, preferably diisocyanates, which may have been biuretized and/or isocyanurated by generally known methods. Specific examples are alkylene diisocyanates having 4 to 12 carbon atoms in the alkylene radical, such as dodecane 1,12-diisocyanate, 2-ethyltetramethylene 1,4-diisocyanate, 2-methylpentamethylene 1,5-diisocyanate, tetramethylene 1,4-diisocyanate, lysine ester diisocyanates (LDI), hexamethylene 1,6-diisocyanate (HDI), cyclohexane 1,3- and/or 1,4-diisocyanate, hexahydrotolylene 2,4- and 2,6-diisocyanate and the corresponding isomer mixtures, dicyclohexylmethane 4,4'-, 2,2'- and 2,4'-diisocyanate and the corresponding isomer mixtures, 1-isocyanato-3,3,5-trimethyl-5-isocyanatomethylcyclohexane (IPDI), tolylene 2,4- and/or 2,6-diisocyanate (TDI), diphenylmethane 4,4'-, 2,4'- and/or 2,2'-diisocyanate (MDI), polyphenylpolymethylene polyisocyanates and/or mixtures containing at least two of said isocyanates. Di- and/or polyisocyanates containing ester, urea, allophanate, carbodiimide, uretdione and/or urethane groups may also be used in the novel process. 2,4'-, 2,2'- and/or 4,4'-MDI and/or polyphenylpolymethylene polyisocyanates are preferably used, particularly preferably mixtures containing polyphenylpolymethylene polyisocyanates and at least one of the MDI isomers.

For example, compounds which have hydroxyl, thiol and/or primary and/or secondary amino groups as groups reactive toward isocyanates and usually have a molecular weight of from 60 to 10 000 g/mol, for example polyols selected from the group consisting of the polymer polyols, polyetherpolyalcohols, polyesterpolyalcohols, polythioetherpolyols, hydroxyl-containing polyacetals and hydroxyl-containing aliphatic polycarbonates or mixtures of at least two of said polyols, can be used as compounds (b) reactive toward isocyanates. These compounds usually have a functionality with respect to isocyanates of from 2 to 6 and a molecular weight of from 400 to 8 000 and are generally known to a person skilled in the art.

For example, suitable polyetherpolyalcohols are compounds which are obtainable according to known technology by an addition reaction of alkylene oxides, for example tetrahydrofuran, 1,3-propylene oxide, 1,2- or 2,3-butylene oxide, styrene oxide and preferably ethylene oxide and/or 1,2-propylene oxide, with conventional initiator substances. For example, known aliphatic, araliphatic, cycloaliphatic and/or aromatic compounds which contain at least one hydroxyl group, preferably from 2 to 4 hydroxyl groups, and/or at least one amino group, preferably from 2 to 4 amino groups, can be used as initiator substances. For example, ethanediol, diethylene glycol, 1,2- or 1,3-propanediol, 1,4-butanediol, 1,5-pentanediol, 1,6-hexanediol, 1,7-heptanediol, glycerol, trimethylolpropane, neopentylglycol, sugar, for example sucrose, pentaerythritol, sorbitol, ethylenediamine, propanediamine, neopentanediamine, hexamethylenediamine, isophoronediamine, 4,4'-diaminodicyclohexylmethane, 2-(ethylamino)ethylamine, 3-(methylamino)propylamine, diethylenetriamine, dipropylenetriamine and/or N,N'-bis(3-aminopropyl)ethylenediamine can be used as initiator substances.

The alkylene oxides may be used individually, alternately in succession or as mixtures. Alkylene oxides which lead to primary hydroxyl groups in the polyol are preferably used. Particularly preferably used polyols are those which have been alkoxylated with ethylene oxide at the end of the alkoxylation and therefore have primary hydroxyl groups.

Compounds generally known from polyurethane chemistry, preferably styrene/acrylonitrile graft polyols, may be used as polymer polyols, a special class of the polyetherpolyols. It is precisely the use of polymer polyols which can significantly reduce the shrinkage of the polyisocyanate polyadduct, for example of polyurethane, and thus lead to improved adhesion of (ii) to (i) and (iii). If required, blowing agents (f) and/or gases (c) can preferably be used as further measures for reducing the shrinkage.

Suitable polyesterpolyols can be prepared, for example, from organic dicarboxylic acids of 2 to 12 carbon atoms, preferably aliphatic dicarboxylic acids of 4 to 6 carbon atoms, and polyhydric alcohols, preferably diols, of 2 to 12, preferably 2 to 6, carbon atoms. The polyesterpolyols preferably have a functionality of from 2 to 4, in particular from 2 to 3, and a molecular weight of from 480 to 3 000, preferably from 600 to 2 000, in particular from 600 to 1 500.

The novel composite elements are preferably produced using polyetherpolyalcohols as component (b) for reaction with the isocyanates, expediently those having an average functionality with respect to isocyanates of from 1.5 to 8, preferably from 2 to 6, and a molecular weight of from 400 to 8 000.

The use of polyetherpolyalcohols has considerable advantages because of improved stability of the polyisocyanate polyadducts to hydrolytic cleavage and owing to the lower viscosity, in each case compared with polyesterpolyalcohols. The improved stability to hydrolysis is particularly advantageous in the case of an application in shipbuilding. The lower viscosity of the polyetherpolyalcohols and of the reaction mixture for the production of (ii) containing the polyetherpolyalcohols permits more rapid and simpler filling of the space between (i) and (iii) with the reaction mixture for the production of the composite elements. Owing to the considerable dimensions, in particular of structural parts in shipbuilding, low-viscosity liquids are of considerable advantage.

In addition to said compounds having a customary molecular weight of from 400 to 8 000, as compounds reactive toward isocyanates, if required diols and/or triols having a molecular weight of from 60 to <400 may furthermore be used as chain extenders and/or crosslinking agents in the novel process. For modifying the mechanical properties, for example the hardness, however, the addition of chain extenders, crosslinking agents or, if required, mixtures thereof may prove advantageous. The chain extenders and/or crosslinking agents preferably have a molecular weight of from 60 to 300. For example, aliphatic, cycloaliphatic and/or aralphatic diols of 2 to 14, preferably 4 to 10, carbon atoms, e.g. ethylene glycol, 1,3-propanediol, 1,10-decanediol, o-, m- and p-dihydroxycyclohexane, diethylene glycol, dipropylene glycol and preferably 1,4-butanediol, 1,6-hexanediol and bis(2-hydroxyethyl)hydroquinone, triols, such as 1,2,4- and 1,3,5-trihydroxycyclohexane, glycerol and trimethylolpropane, low molecular weight hydroxyl-containing polyalkylene oxides based on ethylene oxide and/or 1,2-propylene oxide and the abovementioned diols and/or triols, as initiator molecules, and/or diamines, such as diethyltoluenediamine and/or 3,5-dimethylthio-2,4-toluenediamine, are suitable.

If chain extenders, crosslinking agents or mixtures thereof are used for the preparation of the polyisocyanate polyadducts, they are expediently employed in an amount of from 0 to 30, preferably from 1 to 30, % by weight, based on the total weight used of the compounds (b) reactive toward isocyanates.

In addition, aliphatic, aralphatic, cycloaliphatic and/or aromatic carboxylic acids can be used as (b) for optimizing the course of curing in the production of (ii). Examples of such carboxylic acids are formic acid, acetic acid, succinic acid, oxalic acid, malonic acid, glutaric acid, adipic acid, citric acid, benzoic acid, salicylic acid, phenylacetic acid, phthalic acid, toluenesulfonic acid, derivatives of said acids, isomers of said acids and any desired mixtures of said acids. The amount by weight of these acids may be from 0 to 5, preferably from 0.2 to 2, % by weight, based on the total weight of (b). With the use of amine-initiated polyetherpolyalcohols, the curing behavior of the reaction mixture for the production of (ii) can also be improved. The compounds (b), as well as the other components for the production of (ii) are preferably used with as low a water content as possible in order to avoid the formation of carbon dioxide by reaction of the water with isocyanate groups.

Generally known compounds which have a boiling point at 1 bar of less than (i.e. at temperatures lower than) −50° C., for example air, carbon dioxide, nitrogen, helium and/or neon, can be used as component (c) for the production of (ii). Preference is given to the use of air. The component (c) is preferably inert to the component (a), particularly preferably to the components (a) and (b), i.e. there is scarcely any, preferably no, detectable reactivity of the gas with (a) and (b). The use of the gas (c) differs fundamentally from the use of conventional blowing agents for the preparation of foamed polyurethanes. While conventional blowing agents (f) are used in liquid form (or, in the case of gaseous physical blowing agents, are soluble to a low percentage in the polyol component) and during the reaction either vaporize owing to the evolution of heat or, in the case of water, evolve gaseous carbon dioxide owing to the reaction with the isocyanate groups, in the present invention the component (c) is preferably used in gaseous form as an aerosol, for example in the polyol component.

Generally known compounds which greatly accelerate the reaction of isocyanates with the compounds reactive toward isocyanates can be used as catalysts (d), a total catalyst content of from 0.001 to 15, in particular from 0.05 to 6, % by weight, based on the total weight used of the compounds reactive toward isocyanates, preferably being employed. For example, the following compounds may be used: triethylamine, tributylamine, dimethylbenzylamine, dicyclohexylmethylamine, dimethylcyclohexylamine, N,N,N'N'-tetramethyldiaminodiethyl ether, bis(dimethylaminopropyl)urea, N-methyl- or N-ethylmorpholine, N-cyclohexylmorpholine, N,N,N',N'-tetramethylethylenediamine, N,N,N',N'-tetramethylbutanediamine, N,N,N',N'-tetramethylhexane-1,6-diamine, pentamethyldiethylenetriamine, dimethylpiperazine, N-dimethylaminoethylpiperidine, 1,2-dimethylimidazole, 1-azabicyclo[2.2.0]octane, 1,4-diazabicyclo[2.2.2]octane (Dabco) and alkanolamine compounds, such as triethanolamine, triisopropanolamine, N-methyl- and N-ethyldiethanolamine, dimethylaminoethanol, 2-(N,N-dimethylaminoethoxy)ethanol, N,N',N"-tris(dialkylaminoalkyl) hexahydrotriazines, e.g. N,N',N"-tris(dimethylaminopropyl)-s-hexahydrotriazine, iron(II) chloride, zinc chloride, lead octanoate and preferably tin salts, such as tin dioctanoate, tin diethylhexanoate, dibutyltin dilaurate and/or dibutyldilauryltin mercaptide, 2,3-dimethyl-3,4,5,6-tetrahydropyrimidine, tetraalkylammonium hydroxides, such as tetramethylammonium hydroxide, alkali metal hydroxides, such as sodium hydroxide, alkali metal alcoholates, such as sodium methylate and potassium isopropylate, and/or alkali metal salts of long-chain fatty acids having 10 to 20 carbon atoms and, if required, OH side groups.

It has proven very advantageous to carry out the production of (ii) in the presence of (d) in order to accelerate the reaction.

If required, (e) assistants can be incorporated into the reaction mixture for the preparation of the polyisocyanate polyadducts (ii). Examples are fillers, surface-active substances, dyes, pigments, flameproofing agents, hydrolysis stabilizers, fungistatic and bacteriostatic substances and foam stabilizers.

Suitable surface-active substances are, for example, compounds which serve for supporting the homogenization of the starting materials and may also be suitable for regulating the structure of the plastics. Examples are emulsifiers, such as the sodium salts of castor oil sulfates or of fatty acids and salts of fatty acids with amines, for example of oleic acid with diethylamine, of stearic acid with diethanolamine and of ricinoleic acid with diethanolamine, salts of sulfonic acids, for example alkali metal or ammonium salts of dodecylbenzene- or dinaphthylmethanedisulfonic acid and ricinoleic acid.

Surface-active substances are usually used in amounts of from 0.01 to 5% by weight, based on 100% by weight of the total amount used of compounds (b) reactive toward isocyanates.

Suitable flameproofing agents are, for example, tricresyl phosphate, tris(2-chloroethyl) phosphate, tris(2-chloropropyl) phosphate, tris(1,3-dichloropropyl) phosphate, tris(2,3-dibromopropyl) phosphate, tetrakis(2-chloroethyl) ethylene diphosphate, dimethyl methanephosphonate, diethyl diethanolaminomethylphosphonate and commercial halogen-containing polyol flameproofing agents. In addition to the abovementioned halogen-substituted phosphates, inorganic or organic flameproofing agents, such as red phosphorus, hydrated aluminum oxide, antimony trioxide, arsenic oxide, ammonium polyphosphate and calcium sulfate, expanded graphite or cyanuric acid derivatives, e.g. melamine, or mixtures of at least two flameproofing agents, e.g. ammonium polyphosphates and melamine and, if required, cornstarch or ammonium polyphosphate, melamine and expanded graphite and/or, if required, aromatic polyesters, can also be used for flameproofing the polyisocyanate polyadducts. In general, it has proven expedient to use from 5 to 50, preferably from 5 to 25, % by weight, based on the total weight used of the compounds reactive toward isocyanates, of said flameproofing agents.

Fillers, in particular reinforcing fillers, are to be understood as meaning the conventional organic and inorganic fillers, reinforcing materials, weighting materials, compositions for improving the abrasion behavior in surface coatings, coating materials, etc., which are known per se. Specific examples are inorganic fillers, such as silicate minerals, for example sheet silicates, such as antigorite, serpentine, hornblendes, amphiboles, chrysotile and talc, metal oxides, such as kaolin, aluminas, titanium oxides and iron oxides, metal salts, such as chalk, barite and inorganic pigments, such as cadmium sulfide and zinc sulfide, and glass, etc. Kaolin (china clay), aluminum silicate and coprecipitates of barium sulfate and aluminum silicate and natural and synthetic fibrous minerals, such as wollastonite, and short metal and glass fibers are preferably used. Examples of suitable organic fillers are carbon, melamine, rosin, cyclopentadienyl resins and graft polymers and cellulosic fibers, polyamide, polyacrylonitrile, polyurethane and polyester fibers based on aromatic and/or aliphatic dicarboxylic esters and in particular carbon fibers. The inorganic and organic fillers can be used individually or as mixtures.

Preferably from 10 to 70% by weight, based on the weight of (ii), of fillers are used as (e) assistants in the production of (ii). Preferably used fillers are talc, kaolin, calcium carbonate, barite, glass fibers and/or microglass spheres. The size of the filler particles should preferably be chosen so that the introduction of the components for the production of (ii) into the space between (i) and (iii) is not hindered. The fillers particularly preferably have particle sizes of <0.5 mm.

The fillers are preferably used as a mixture with the polyol component in the reaction for the preparation of the polyisocyanate polyadducts.

The fillers may serve for reducing the coefficient of thermal expansion of the polyisocyanate polyadducts, which is greater than, for example, that of steel, and thus adapting it to that of steel. This is particularly advantageous for a permanently strong bond between the layers (i), (ii) and (iii) since smaller stresses occur thereby between the layers under thermal load.

Conventional foam stabilizers which are commercially available and generally known to a person skilled in the art, for example generally known polysiloxane/polyoxyalkylene block copolymers, e.g. Tegostab 2219 from Goldschmidt, are preferably used as (e) for the production of (ii). The amount of these foam stabilizers in the production of (ii) is preferably from 0.001 to 10, particularly preferably from 0.01 to 10, in particular from 0.01 to 2, % by weight, based on the weight of the components (b), (e) and, if required, (d) used for the production of (ii). The use of these foam stabilizers stabilizes the component (c) in the reaction mixture for the production of (ii).

Blowing agents generally known from polyurethane chemistry, for example physical and/or chemical blowing agents, can be used as blowing agents (f). Such physical blowing agents generally have a boiling point at 1 bar of more than (i.e. at temperatures higher than) −50° C. Examples of physical blowing agents are CFCs, HCFCs, HFCs, aliphatic hydrocarbons, cycloaliphatic hydrocarbons, each of, for example, 4 to 6 carbon atoms, or mixtures of these substances, for example trichlorofluoromethane (boiling point 24° C.), chlorodifluoromethane (boiling point −40.8° C.), dichlorofluoroethane (boiling point 32° C.), chlorodifluoroethane (boiling point −9.2° C.), dichlorotrifluoroethane (boiling point 27.1° C.), tetrafluoroethane (boiling point −26.5° C.), hexafluorobutane (boiling point 24.6° C.), isopentane (boiling point 28° C.), n-pentane (boiling point 36° C.) or cyclopentane (boiling point 49° C.).

Examples of suitable chemical blowing agents, i.e. blowing agents which form gaseous products owing to a reaction, for example with isocyanate groups, are water, compounds containing water of hydration, carboxylic acids, tert-alcohols, e.g. tert-butanol, carbamates, for example the carbamates described in EP-A 1000955, in particular on pages 2, lines 5 to 31, and 3, lines 21 to 42, carbonates, e.g. ammonium carbonate and/or ammonium bicarbonate, and/or guanidine carbamate.

Preferably used blowing agents (f) are water and/or carbamates.

The blowing agents (f) are preferably used in an amount which is sufficient for obtaining the preferred density of (ii) of from 350 to 1 200 kg/m$^3$. This can be determined by simple routine experiments which are generally familiar to a person skilled in the art. Particularly preferably, the blowing agents (f) are used in an amount of from 0.05 to 10, in particular from 0.1 to 5, % by weight, based in each case on the total weight of the polyisocyanate polyadducts.

The weight of (ii) corresponds by definition to the weight of the components (a), (b) and, if required, (c), (d), (e) and/or (f) used for the production of (ii).

For the preparation of the novel polyisocyanate polyadducts, the isocyanates and the compounds reactive toward isocyanates are reacted in amounts such that the ratio of the number of equivalents of NCO groups of the isocyanates (a) to the sum of the reactive hydrogen atoms of the compounds (b) reactive toward isocyanates and, if required, (f) is from 0.85:1 to 1.25:1, preferably from 0.95:1 to 1.15:1, in particular from 1:1 to 1.05:1. If at least some of the isocyanurate groups in (ii) are present in bound form, a ratio of NCO groups to the sum of the reactive hydrogen atoms of from 1.5:1 to 60:1, preferably from 1.5:1 to 8:1, is usually used.

The polyisocyanate polyadducts are usually prepared by the one-shot process or by the prepolymer process, for example with the aid of the high pressure or low pressure technique.

It has proven particularly advantageous to employ the two-component process and to combine the compounds (b) reactive toward isocyanates, if required the blowing agents (f) and, if required, the catalysts (d) and/or assistants (e) in the component (A) (polyol component) and preferably to mix them thoroughly with one another and to use the isocyanates (a) as component (B).

The component (c) can be added to the reaction mixture containing (a), (b) and, if required, (f), (d) and/or (e) and/or to the individual components (a), (b), (A) and/or (B) described above. The component which is mixed with (c) is usually present in liquid form. The components are preferably mixed into the component (b).

The mixing of the corresponding component with (c) can be carried out by generally known methods. For example, (c) can be added to the corresponding component by means of generally known loading apparatuses, for example air loading apparatuses, preferably under pressure, for example from a pressurized container or with compression by a compressor, for example through a nozzle. The corresponding components are preferably thoroughly mixed with (c) so that gas bubbles of (c) in the usually liquid component preferably have a size of from 0.0001 to 10, particularly preferably from 0.0001 to 1, mm.

The content of (c) in the reaction mixture for the production of (ii) can be determined in the return line of the high pressure machine using generally known measuring apparatuses, via the density of the reaction mixture. The content of (c) in the reaction mixture can be regulated by means of a control unit, preferably automatically, on the basis of this density. The component density can be determined and regulated online during the customary circulation of the material in the machine, even in the case of a very low circulation velocity.

The composite elements obtainable according to the invention are used in particular in areas which require structural elements which withstand high forces, for example as structural parts in shipbuilding, for example in ships' hulls, for example ships' double hulls comprising an external and an internal wall, and hold covers, hold bulkheads and loading flaps, or in structures, for example bridges, or as structural elements in building construction, in particular in multistorey buildings.

The novel composite elements should not be confused with traditional sandwich elements which contain a rigid polyurethane and/or polyisocyanurate foam as a core and are usually used for thermal insulation. Owing to their comparatively low mechanical strength, such known sandwich elements will not be suitable for said applications.

We claim:

1. A process for the production of a composite element having a layer structure comprising:
    layer (i) which comprises from 2 to 20 mm of metal, plastic or wood,
    layer (ii) which comprises from 10 to 300 mm of plastic and
    layer (iii) which comprises from 2 to 20 mm of metal, plastic or wood;
    said process comprising:
    introducing one or more starting materials in a liquid state for the production of said layer (ii), in at least two filling steps, into a space between said layer (i) and said layer (iii),
    a space to be filled in the last filling step having a volume of from 0.1 to 1.5 $m^3$,
    the height of said space to be filled in said last filling step being in a range of from 10 mm to less than 25 mm and
    said layer (i) and said layer (iii) being aligned horizontally and having a deviation of in each case less than 0.5° from a horizontal plane.

2. The process as claimed in claim 1, wherein, in each of said at least two filling steps, from 0.1 to 1.5 $m^3$ of said one or more starting materials in a liquid state for the production of said layer (ii) are introduced and the height of said space to be filled in said last filling step is in a range of from 10 mm to less than 25 mm.

3. The process as claimed in claim 1, wherein said at least two filling steps comprise a filling step (x) and a subsequent filling step (x+1), wherein after said filling step (x), said subsequent filling step (x+1) is not carried out until said one or more starting materials in a liquid state in said filling step (x) have reacted to give said plastic comprised in said layer (ii) to such an extent that said one or more starting materials in the liquid state in said filling steps (x) and (x+1) cannot mix with one another.

4. The process as claimed in claim 1, wherein said space between said layer (i) and said layer (iii) has a width of from 0.5 to 4 m, a length of from 1 to 12 m and a height of from 20 to 150 mm.

5. The process as claimed in claim 1, wherein said layer (ii) comprises one or more polyisocyanate polyadducts obtained by reacting said one or more starting materials comprising (a) one or more isocyanates and (b) one or more compounds reactive toward said one or more isocyanates.

* * * * *